(No Model.) 6 Sheets—Sheet 1.

G. S. SINGER.
INCUBATOR AND BROODER.

No. 464,804. Patented Dec. 8, 1891.

WITNESSES
Thos. H. Houghton.
J. B. Marlow,

INVENTOR
George S. Singer,
By Chas. F. Benjamin
His Atty.

(No Model.) 6 Sheets—Sheet 2.
G. S. SINGER.
INCUBATOR AND BROODER.
No. 464,804. Patented Dec. 8, 1891.
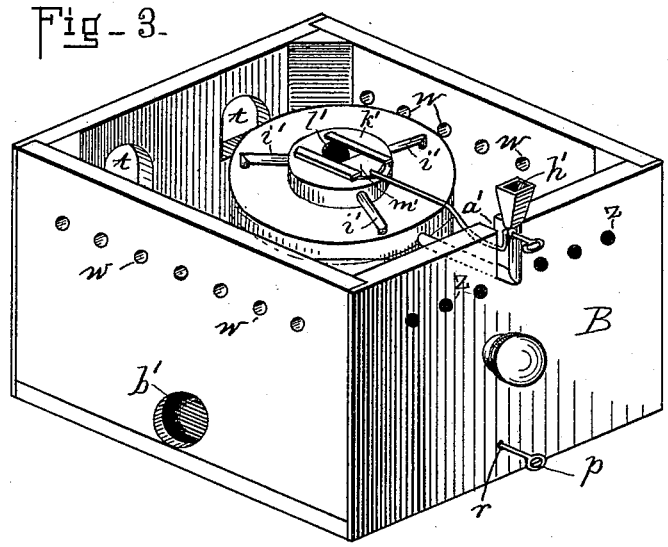
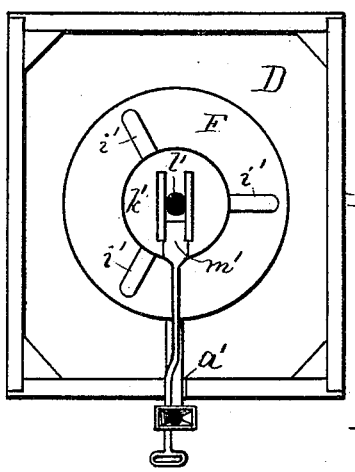
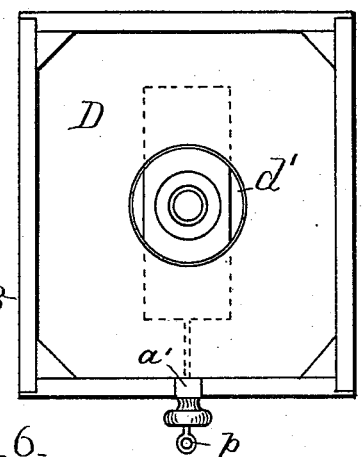
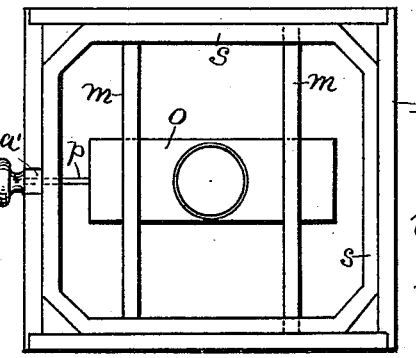
WITNESSES
Thos Houghton.
F. D. Marlow,
INVENTOR
George S. Singer,
By Chas F. Benjamin
His Atty.

(No Model.) 6 Sheets—Sheet 3.
G. S. SINGER.
INCUBATOR AND BROODER.
No. 464,804. Patented Dec. 8, 1891.
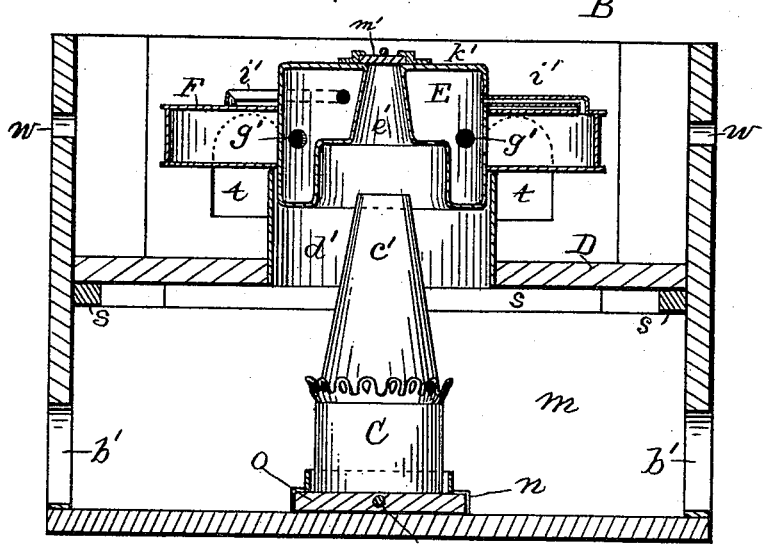
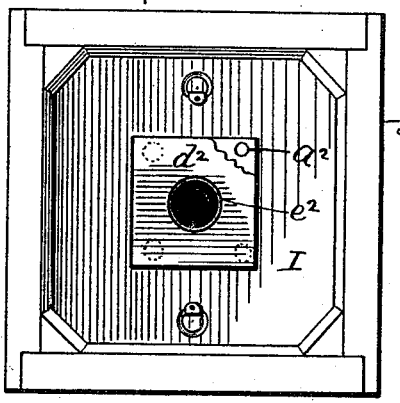 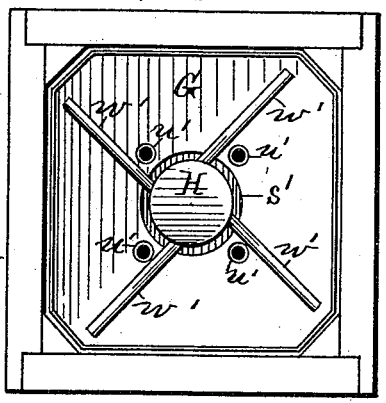
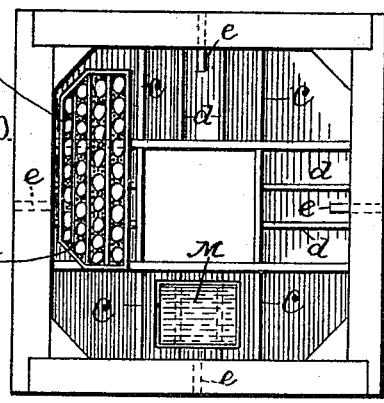
WITNESSES
Thos. Houghton.
F. P. Marlow.
INVENTOR
George S. Singer,
By Chas. F. Benjamin
His Atty.

(No Model.) 6 Sheets—Sheet 4.
G. S. SINGER.
INCUBATOR AND BROODER.
No. 464,804. Patented Dec. 8, 1891.
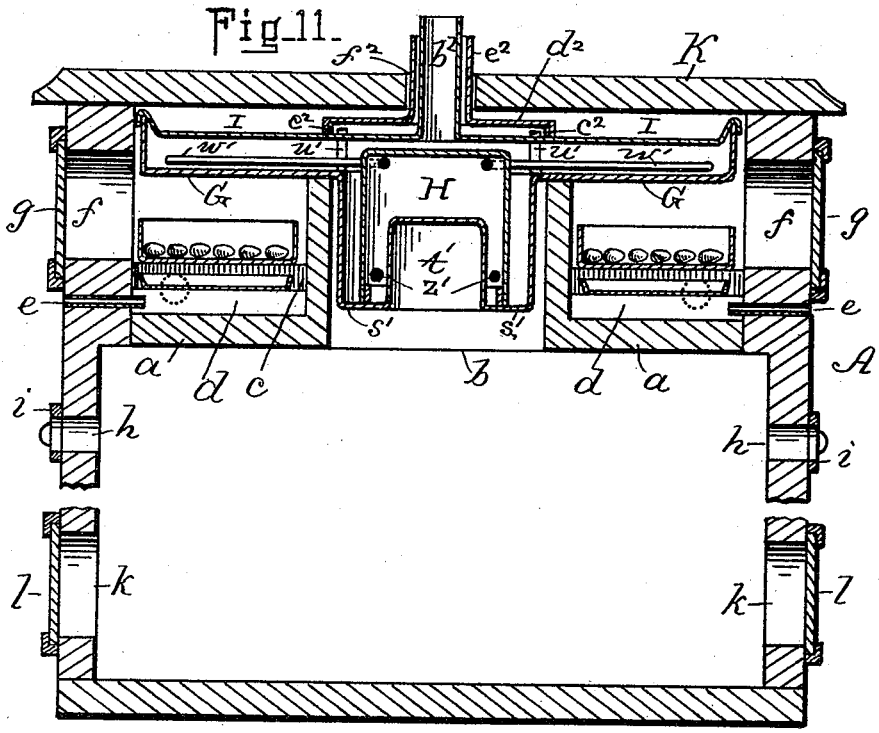
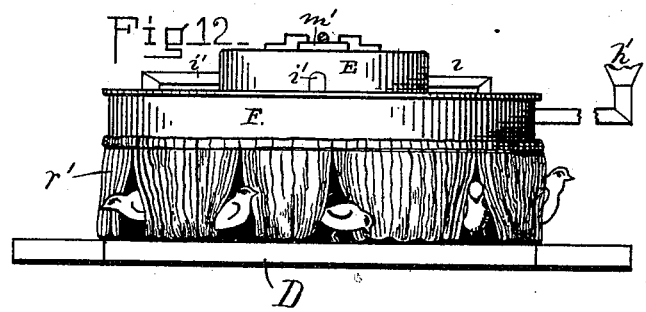
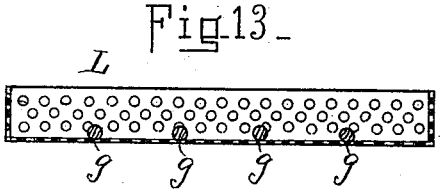
WITNESSES
Thos Houghton.
F. P. Marlow.
INVENTOR
George S. Singer,
By Chas F. Benjamin
His Atty.

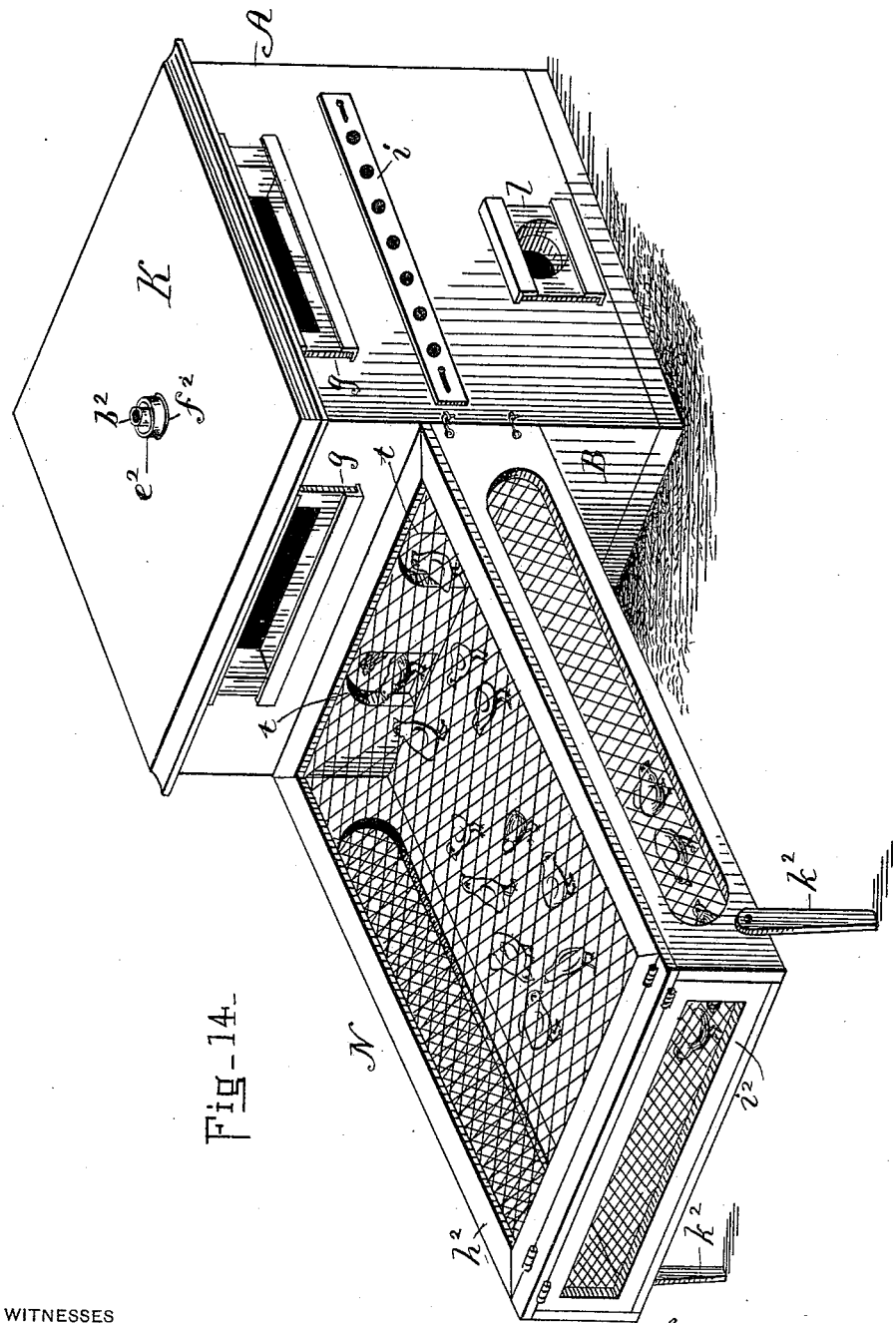

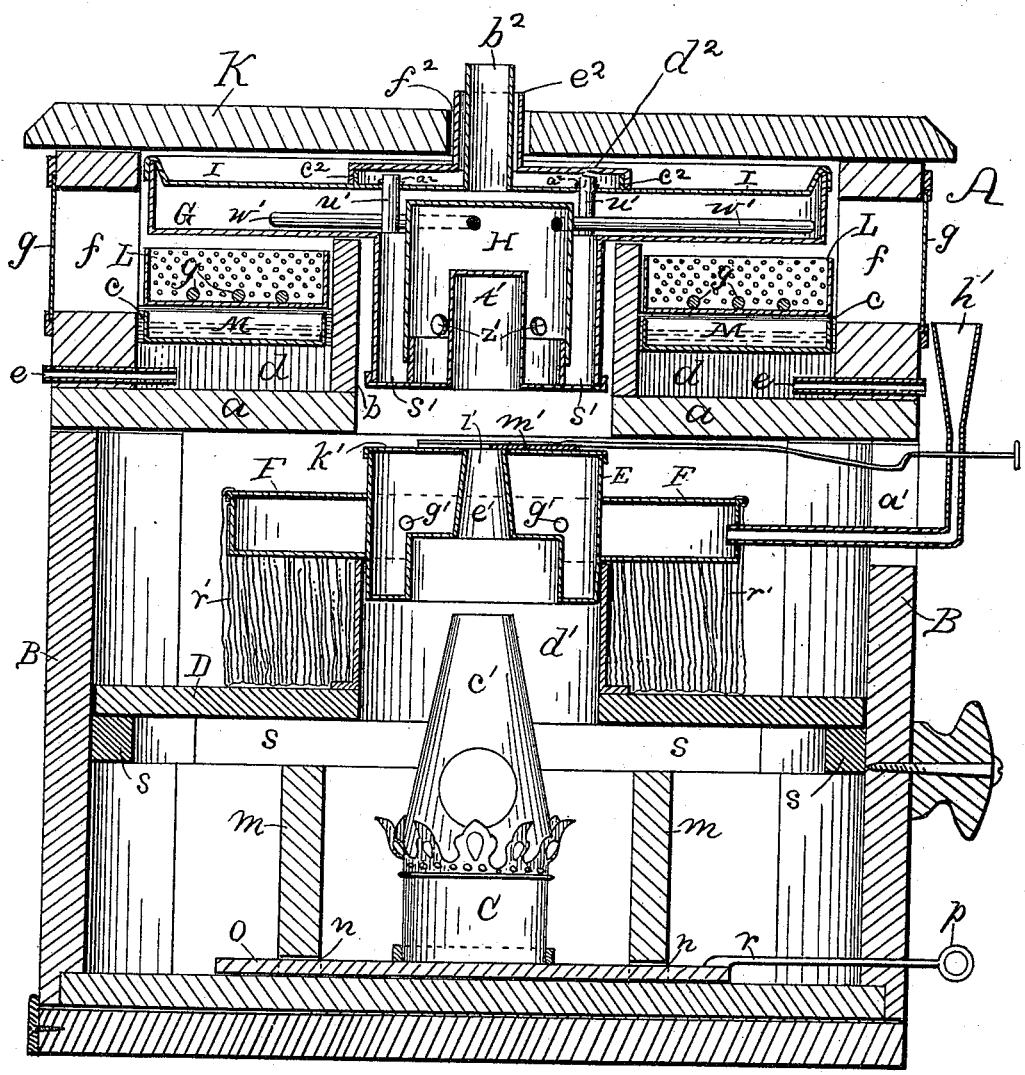

UNITED STATES PATENT OFFICE.

GEORGE S. SINGER, OF CARDINGTON, OHIO.

INCUBATOR AND BROODER.

SPECIFICATION forming part of Letters Patent No. 464,804, dated December 8, 1891.

Application filed August 5, 1891. Serial No. 401,783. (No model.)

*To all whom it may concern:*

Be it known that I, GEORGE S. SINGER, a citizen of the United States, residing at Cardington, in the county of Morrow and State of Ohio, have invented certain new and useful Improvements in Devices for Poultry-Culture; and I do hereby declare the following to be a full, clear, and exact description of the invention, such as will enable others skilled in the art to which it appertains to make and use the same.

This invention relates to a combined incubator and brooder wherein the artificial hatching and rearing of poultry may be carried on simultaneously through a co-operative arrangement of the mechanism necessary to both purposes and with a single supply of artificial heat.

The invention consists, essentially, in a portable box so partitioned and fitted as to accommodate the two operations of hatching and brooding, which may be carried on together or separately, at pleasure, and the construction being such that the entire space and facilities may be assigned to the one or the other operation, as necessity may require.

Figure 1:
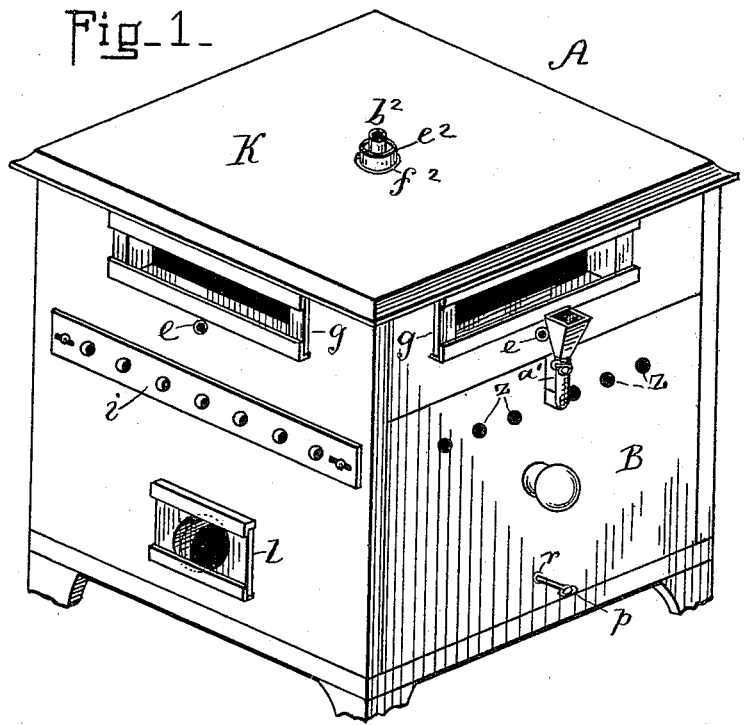
Figure 2:
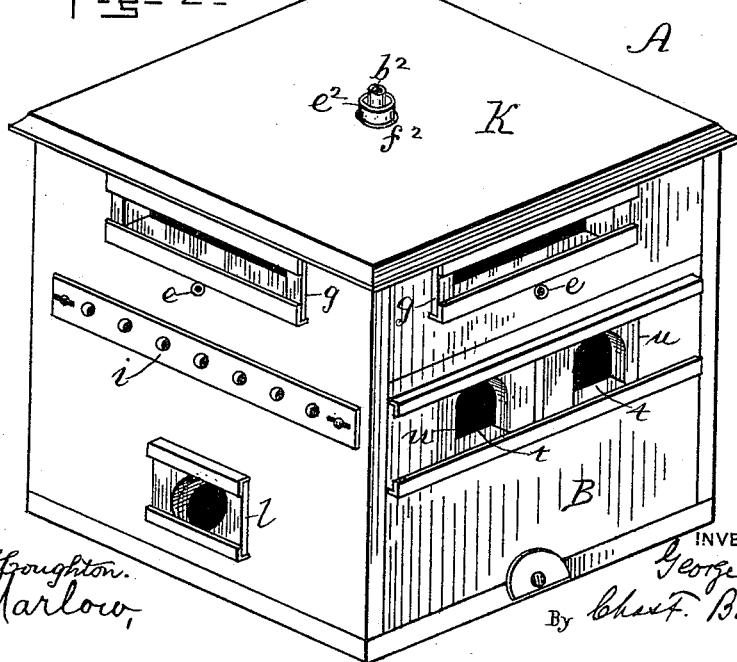

In the accompanying drawings, wherein like letters represent like parts throughout, Figure 1 is an exterior perspective especially showing the front of the box; Fig. 2, a similar view especially showing the rear of the box; Fig. 3, a perspective of the drawer constituting the lower division of the box and particularly devoted to the operation of brooding; Fig. 4, a top plan of said drawer, showing the arrangements for passing heat to the hatching-division above and controlling the supply of heat to the hatchery; Fig. 5, a top plan of said drawer, showing the intermediate removable brooder-floor; Fig. 6, a top plan of the bottom of the drawer, showing the arrangements for heat generation; Fig. 7, a vertical cross-section through the drawer, showing the heating and brooding arrangements; Fig. 8, a top plan of the box with its lid removed, showing the cover of the warm-water tank used in the incubating-division and the arrangements for supplying water to said tank and for passing off smoke and gas ascending from the heating-compartment below; Fig. 9, a like view of the aforesaid tank; Fig. 10, a top plan of the incubating-chamber immediately below the warm-water tank; Fig. 11, a vertical cross-section through the box, showing the incubating arrangements and with the drawer containing the heating and brooding arrangements removed; Fig. 12, a side elevation of the brooder-floor, particularly showing the nestling drapery; Fig. 13, a vertical cross-section of the preferred kind of egg-tray for use in the hatching-chamber; Fig. 14, an exterior perspective of the box, showing the cage or "run" for exercising the chicks; and Fig. 15, a vertical cross-section taken sidewise through the device.

Referring now to Figs. 1, 2, 3, and 14, the letter A represents the portable combination-box heretofore mentioned. K represents the lid of the box, and $f^2$ an orifice in the lid for escape of gas and admission of water. B is a drawer forming part of the box and fitting into the lower section of it.

By referring to Fig. 11 it will be seen that there is a floor immediately above the drawer-space, and this floor divides the box into a relatively-shallow upper incubating-compartment and a relatively-deep lower compartment substantially contained within the drawer for the brooding and heating arrangements. The front of the drawer is pierced with non-closing orifices $z$ to insure ventilation. The upper section of the box has sliding doors $g$, closing the doorways $f$, (shown in Fig. 11,) these doorways and doors serving for both warmth and ventilation. Slides $i$, suitably perforated, regulate apertures $h$ in the side walls of the box, (shown in Fig. 11,) and these apertures correspond with the apertures $w$ in the sides of the drawer, as shown in Fig. 3, and these arrangements also assist in governing temperature and ventilation. To the same end are the slides $l$, governing the large apertures $k$ (shown in Fig. 11) in the side walls of the box, and these apertures correspond with the apertures $b'$, (shown in Fig. 3 as formed in the sides of the drawer,) and these large apertures, with their slides, particularly regulate the supply of air to the lamp, by which the necessary heat for the box is preferably to be obtained. Extending through the walls of the box are ducts $e$, which, as further shown in Fig. 11, insure ventilation to the incubating-compartment when all the adjustable openings are closed.

In the rear wall of the drawer are doorways $t$ for the egress and ingress of the chicks, and these are regulated by slides $u$, which are preferably transparent. A recess $a'$ and an orifice $r$ are cut in the front wall of the drawer to admit of the exterior projection of certain parts, hereinafter to be described, which require operation from the outside, as in the case of other parts projecting through the lid K of the box.

Referring next to Figs. 3 to 7, inclusively, the letter $m$ represents partitions built across the bottom of the drawer to lessen lateral radiation of heat from the lamp C, and therefore to assist in directing the current of heat upward. In each of these partitions is a recess $n$, and these recesses, in conjunction with the bottom of the drawer, form two slots, in which moves to and fro a platform $o$, supporting the lamp. By adjustably moving this platform the full direct current of heat may be sent upward through the box into the incubating-compartment, or the direct current may be confined to the brooding-compartment and only a deflected and reduced current permitted to reach the upper compartment. The lamp-platform has a handle $p$, reaching outward from the front wall of the drawer, so that the lamp-current may be regulated without disturbance of the drawer. Above the partitions $m$ is a ledge $s$, extending around the inner walls of the drawer, and this supports the brooder-floor D, which is removable, in order that access may be had to the lamp beneath. In the middle of this brooder-floor is a well $d'$, with the high wall particularly shown in Fig. 7, and through this well the heat ascends. Resting upon the wall of the well is a shallow boiler F, through the center of which is a hollow cylinder E, closed at both ends and fitting tightly within the well. The bottom of this cylinder, as shown in Fig. 7, is formed up into a conical and broad-based flue $e'$, into which the heat-current is conducted by the conical lamp-chimney $c'$, after which the heat-current escapes upward through the orifice $l'$, formed in the head $k'$ of the cylinder, the escape being regulated by the slide $m'$ over said orifice. The slide may be operated from the outside of the drawer by its handle projected for that purpose. Communication is established between the cylinder E and the boiler F and an intercirculation of the heated and heating water maintained through the orifices $g'$ and the tubes $i'$, so that the said parts E and F are virtually a single boiler. The boiler F is fed from the outside through a funnel $h'$, as shown in Figs. 1 and 3 of the drawings.

Next referring to Figs. 8 to 11, inclusively, the letter $a$ represents the floor of the incubating or hatching compartment. Upon said floor are joists $c$, arranged in pairs, as best shown in Fig. 10, to support the egg-trays L, which are partitioned by slats $g^2$, and between each pair of said joists is a lower pair $d$, intended to support a common shallow water-pan M, placed beneath the egg-tray, so as to increase the moisture within the hatching-compartment. In the center of the floor is a hatch $b$, (shown in Figs. 10 and 11,) the walls of which are carried well up, and upon and over this hatch rests a water-tank G, the center of which is formed into well $s'$, descending the walled space of the hatch. The bottom of this well is shaped upward into a hollow core $t'$ closed at the top, as shown in Fig. 11, the object of the core being to expedite the warming of the water by increasing the heating-surface of the tank. A cap H fits loosely over the core, being supported from the floor of the tank by arms $w'$, which are tubes open at both ends and communicating with the interior of the cap, which thus helps to circulate the water contained in the tank. In the lower part of the cap are orifices $z'$, which also facilitate the movement of the water. Vertical tubes $u'$, carried high enough to prevent overflow at their mouths and open at both ends, are inserted in and through the bottom of the tank G to serve as vents for smoke or gas ascending from the lamp below. A cover I fits upon and over the tank and has orifices $a^2$, corresponding with the tubular vents just described. The orifices $a^2$ are surrounded by a rim $c^2$, over which fits a lid $d^2$, ending in a sleeve $e^2$, which projects through the lid of the box and discharges into the air the smoke or gas coming up through the tubular vents and orifices already described. The cover I is formed in its center into a tube $b^2$, which also projects through the lid of the box and into which water may be fed for the supply of the tank below, as clearly shown in Fig. 11.

Referring especially to Fig. 12, a fringe or draping $r'$ is shown depending from the rim of the boiler F to the brooding-floor D, behind which the chicks may nestle against the wall of the well $d'$, the overhanging of the boiler affording sufficient nestling-space between the drapery and the well.

In Fig. 14 the run N is shown attached to the doorways $t$ of the brooding-compartment. The open-work roof $h^2$ is hinged in order that it may be opened when desired. The end wall $i^2$ is also hinged, so that it may be opened to afford egress to the ground or to another run connected with the one attached to the box. The attaching end of the run has no wall. The folding legs $k^2$ may be set at such an angle as to lower the outward end of the run to or toward the ground or other support or to raise the outer end from or farther above the ground.

By simple and obvious rearrangements the hatching-compartment may be used for brooding purposes and the brooding-compartment for hatching purposes whenever desired.

It is apparent that by closing the orifice $l'$ in the cylinder E by means of the slide $m'$ the heat will be substantially confined to the brooding-chamber, and that by removing the cylinder and its attached boiler F the heat will be almost wholly conveyed to the hatching or incubating chamber, and also that by obvious manipulations of the various parts connected with the supply of heat and of exterior air both the degree and distribution of heat can be controlled within large practical limits.

Having thus fully described my invention, which is an outgrowth of the invention described in the Letters Patent granted to me May 1, 1888, and numbered 381,960, I claim as follows:

1. A breeding-box for poultry, consisting in the combination of the case A, divided into two compartments by the floor $a$ and having a hatchway $b$ in said floor, the drawer B, fitting into the lower compartment of the said case, the lamp C, having the conical chimney $c'$ and resting upon the bottom of said drawer, the movable floor D, fitting and suitably supported within said drawer and having the well $d'$ in the center of said floor, the boiler F, having the funnel $h'$ and the flue $e'$ and supported upon and within the well of said floor, the tank G, having the well $s'$ and supported upon and within the hatchway $b$, the cover I, fitting upon said tank and having the tube $b^2$, and the lid K, having the orifice $f^2$ in the center thereof, said case and drawer being provided with doorways and doors and with apertures for the admission of air, and the said case being further provided with ordinary slides for closing such apertures at pleasure, the whole constructed and arranged as hereinbefore described, for the purposes set forth.

2. The combination, in an incubator, of the case A, having an upper floor $a$ and a hatchway $b$ in said floor, the tank G, fitting within said case above and upon said hatchway and having a well $s'$, fitting within said hatchway, and with the bottom of said well formed into a hollow core $t'$, and the cover I, fitting upon said tank and having the tube $b^2$ in communication with said tank, the said case being provided with doorways and doors and with apertures for air, all above said upper floor, and the lower part of said case being adapted to and provided with any proper means for applying heat to the bottom of the aforesaid well, the said combination being constructed and arranged substantially as and for the purposes described.

3. The combination, in poultry-breeding devices, of the tank G, having a well $s'$ in the center thereof, with bottom formed up into a hollow core $t'$, the cap H, fitting loosely within said well and loosely over said core and having the tubes $w'$ open at both ends and orifices $z'$ around the lower part of said cap, and the cover I, fitting upon said tank and having the tube $b^2$ in communication therewith, the said tank being suitably heated from beneath, the combination aforesaid being constructed and arranged, substantially as set forth, for the purpose of heating water within said tank and keeping the same in circulation.

4. The combination, in an incubator for poultry, of the box A, having the floor $a$ and the hatchway $b$, the box-lid K, having the orifice $f^2$, the tank G, having the well $s'$, the tank-cover I, having the tube $b^2$, and the lamp C, having the chimney $c'$, the said box provided with proper openings in the walls thereof for admission of air and escape of gas, smoke, and heat, and with proper doors or slides for closing such openings at will, the whole constructed and arranged substantially as and for the purposes described.

5. The combination, in a heating apparatus for a combined incubator and brooder for poultry, of the lamp C, having the chimney $c'$, the boiler F, supported above said lamp and having the funnel $h'$ and flue $e'$, the tank G, supported above said boiler and having the well $s'$, and the tank-cover I, having the tube $b^2$, the whole constructed and arranged substantially as and for the purposes described.

6. The combination, in a poultry-brooder, of the case B, having the ledge $s$ and doorways $t$, the movable floor D, having the well $d'$, the cylinder E, having the orifices $g'$ and the head $k'$, the boiler F, having the funnel $h'$ and the draping $r'$, the lamp C, having the chimney $c'$, the lid K, and the run N, having the hinged roof $h^2$, hinged end wall $i^2$, and folding legs $k^2$, the said case provided in the walls thereof with proper apertures for ventilation and escape of gas and smoke, and the whole constructed and arranged substantially as and for the purposes described.

In testimony whereof I affix my signature in presence of two witnesses.

GEO. S. SINGER.

Witnesses:
FREDK. J. BENJAMIN,
FRANK B. MARLOW.